M. W. BEEMER.
CONVEYER CHAIN.
APPLICATION FILED NOV. 11, 1915.
1,187,701.
Patented June 20, 1916.
2 SHEETS—SHEET 1.
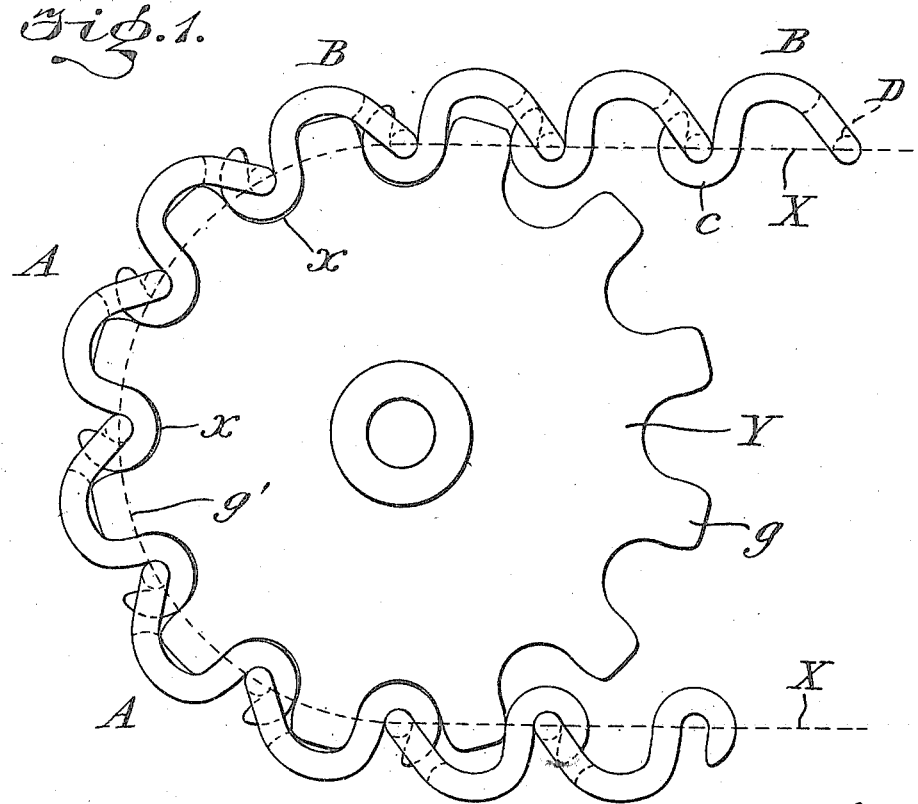
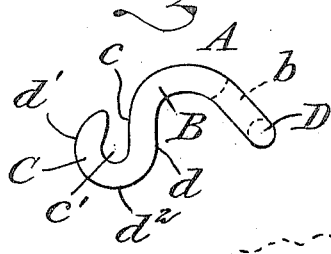
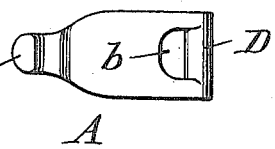
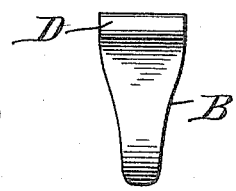
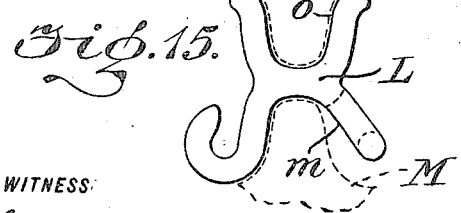
WITNESS:
O. C. Abbott
INVENTOR
Miles W. Beemer
BY
Edson Bernhard
ATTORNEYS

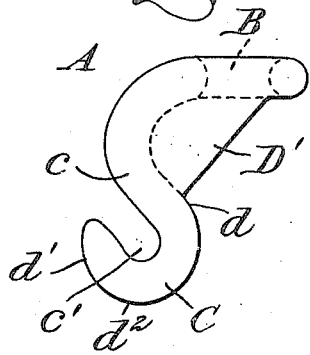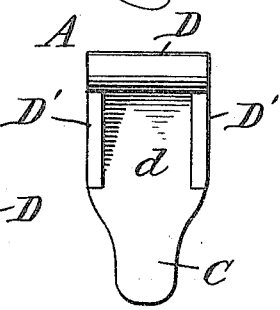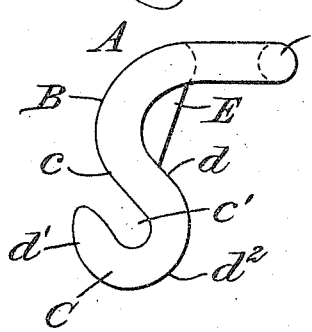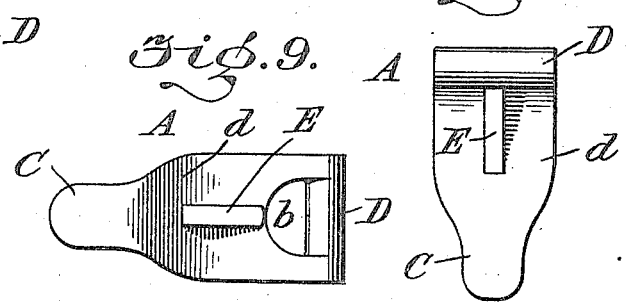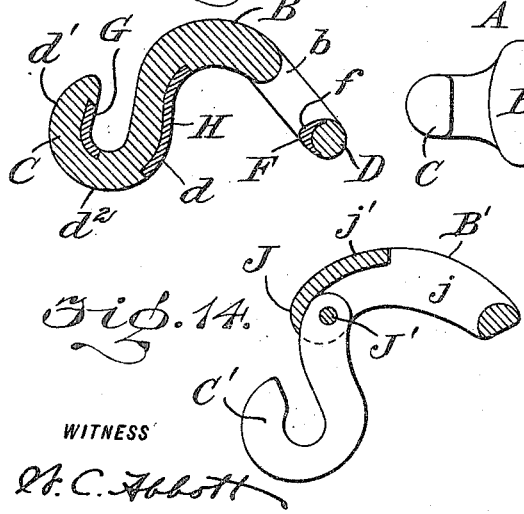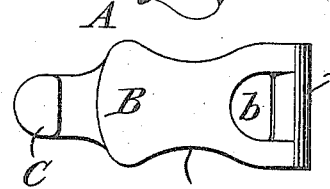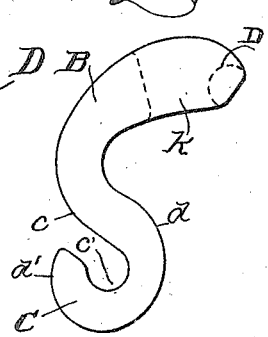

UNITED STATES PATENT OFFICE.

MILES W. BEEMER, OF JERSEY CITY, NEW JERSEY.

CONVEYER-CHAIN.

1,187,701.  Specification of Letters Patent.  Patented June 20, 1916.

Application filed November 11, 1915. Serial No. 60,897.

*To all whom it may concern:*

Be it known that I, MILES W. BEEMER, a citizen of the United States, residing at Jersey City, county of Hudson, and State of New Jersey, have invented a certain new and useful Conveyer-Chain, of which the following is a specification.

This invention is a chain adapted for various useful purposes, such as for chain conveyers, power transmission, etc.

The object of the invention is to minimize the friction and the wear upon the links composing the chain and upon the sprockets due to the contact between said links and the sprocket.

A further object is to enable the chain to be driven in one direction or in a contrary direction with equal facility, and, further, to permit said chain to be readily crossed between adjacent sprockets or pulleys, and, further in one form of the invention to provide for the use of the single links in connection with two adjacent sprocket wheels.

The chain of this invention is characterized by substantially imperforate links provided with hooks of such form, and construction that said links are in contact with the teeth of a sprocket wheel substantially on the pitch line thereof, whereby the friction and wear is minimized upon the links and upon the teeth and other peripheral surfaces of the sprocket.

The links are, or may be, provided with means for confining them against edgewise movement relatively to the sprocket gear, whereby the links are not liable to become displaced from the gear. Furthermore, each link is, or may be, provided with an inserted hard-metal wear-member on the coupling bar and also on the hook of said link, said wear-members of adjacent links being so positioned that they will engage with and turn on one another when the links are connected, whereby friction and wear are further reduced.

A further feature of the invention is a single link provided with reversely positioned contacting surfaces adapted for coöperation with the teeth of two adjacent sprocket wheels, whereby the single links are adapted to impart movement simultaneously to a plurality of sprocket wheels positioned adjacent to each other.

Other features of construction will be hereinafter described in connection with the accompanying drawings, wherein—

Figure 1 shows in side elevation one form of a sprocket gear and a part of my new chain; Figs. 2, 3 and 4 are views in side elevation, plan and end elevation, respectively, of one link; Figs. 5, 6 and 7 are views in side elevation, plan, and end elevation, respectively, of another embodiment of the link which is especially adapted to shroud the teeth of a sprocket gear; Figs. 8, 9 and 10 are views of another form of link with a web adapted to strengthen the link and to hold it from displacement on a sprocket gear; Fig. 11 is a longitudinal section through my link with inserted wear members on the coupling bar and the hook thereof; Fig. 12 is a plan view of a link with concave side bars especially adapted for use in connection with a grooved chain wheel; Fig. 13 is a side view of another form of link wherein I employ arched side bars; and Fig. 14 represents a two-part pivoted link embodying the invention. Fig. 15 is a side elevation of a single link provided with a plurality of contacting surfaces adapted for coöperation with the teeth of two adjacent sprocket wheels, and Fig. 16 is an end view of the link shown in Fig. 15.

My new chain consists of links A, hooked one to the other in series, substantially as shown by Fig. 1, wherein a form of chain is represented that is especially adapted for use in connection with a sprocket wheel Y, said sprocket being provided with usual teeth $g$.

Each link is, preferably, cast in a single piece of metal, although it will be understood that the invention is not restricted to cast links, because I may produce one-piece links by forging, or any other suitable mode of procedure. The link shown by Figs. 1 to 4, inclusive, consists of a body B, a hook C, and a coupling bar D. The link is bent or deflected at a point intermediate of its length, substantially, where the body and the hook join or merge one into the other, and the body portion B lies at an angle to the shank portion $c$ of the hook, substantially as shown by Figs. 1 and 2. The hook C is turned backwardly upon the shank portion $c$, so as to provide an opening or space $c'$, in which is adapted to fit the coupling bar D, of the next link in the chain. The throat or entrance to the space $c'$ is smaller than the space which receives the coupling bar of a companion link, and this coupling bar may be flattened at one or both sides, as substantially shown by Fig. 3, as is common in the art, for the purpose of preventing the coupling bar of one link from accidentally slipping out of the throat in the hook of the next link. The body portion B is provided with an opening or slot $b$, adjacent to the coupling bar D, said slot being designed for the reception of the hook C whereby the links are so connected by the hooks C and bars D, as to have a certain flexible movement relative to each other.

The hook of my improved link is adapted to fit into the space between two adjoining teeth $g$, of the sprocket wheel substantially as shown by Fig. 1, and said hook has faces $d$, $d'$, which are adapted for engagement with adjacent sprocket teeth on the pitch line $g'$ thereof, the outer or under face $d^2$ of said hook C having a curve of shorter radius than the curved face $x$ at the base of the teeth $g$. The hook C is of greatest thickness at the portions which engage along the pitch line of the sprocket teeth, and the peculiar form of the hook enables it to engage with the sprocket teeth in a way to minimize the friction and wear on both the chain and the sprocket, while, at the same time, the links of the chain will engage and disengage themselves easily with the sprocket teeth.

In my new form of chain the hooks C engage with the coupling bars D of the links in such a manner that the line of draft through the chain is through the coupling bars and the hooks. This causes the curved body B of each link to lie on, or project from, one side of the line of draft X, substantially as indicated by Fig. 1. The hooks of the links are thus adapted to fit between and engage along the pitch line of the teeth of the sprocket, while the bodies B of said link will fit over the end portions or faces of the sprocket teeth $g$, as indicated in Fig. 1. It will thus be understood that the links are so fashioned that they shroud the sprocket teeth and also have an engagement therewith, and the form of the links is such that they are readily hooked together, whereby a broken or worn link may be removed and its place supplied by a fresh link without the delay and labor of removing a pivot pin.

The link shown by Figs. 5 to 7, inclusive, of the drawings, embodies the general construction heretofore described, and it is modified only to the extent of employing the webs or flanges D'. Said webs are provided at the side portions of the link, and extend from the hook C to the body B. The flanges are parallel to each other, so as to leave a space between them, shown by Fig. 6, for the reception of the sprocket teeth, and said webs serve to strengthen the link, particularly at the bent or curved portion thereof, and they also engage with the sides of the sprocket teeth for the purpose of confining the link from edgewise displacement relative to the sprocket wheel Y. The webs or flanges thus act as shrouds for the sprocket teeth, and they are made to serve the twofold purpose of holding the link in place and of affording additional strength to the link at the place where fracture is liable to occur. It is not desired, however, to confine the invention strictly to the side webs or shrouds D, because in Figs. 8 to 10, inclusive, I have represented another means of strengthening the link and for holding it from edgewise displacement relative to a sprocket wheel. In this embodiment of the invention the link proper is constructed as heretofore described, and it is provided with a single web or flange E, which is located centrally with respect to the link and extends between the hook and the body portion thereof, said central web or flange spanning the space in the link formed by the curved portion or body, as shown by Figs. 8 and 9. This single web E strengthens the link, but a link of this kind requires the chain to be used in connection with a sprocket having a central peripheral groove or channel, in which channel the webs E of the links are adapted to fit, for the purpose of holding the chain against edgewise displacement in an obvious manner.

Another part of my invention consists in the employment of wear members composed of a different material from that of the link, said wear members being, preferably of hardened metal, and provided at the portions of the link which are most exposed to friction in the operation of the chain. In Fig. 11 I have shown the coupling bar D as provided with a hard-metal wear member F on the inner side or face of said coupling bar. The wear member is substantially concavo-convex in cross-section, with its convex face $f$ arranged to face toward the slot $b$ in the body portion of the link. The hook C is, also, provided with a wear member G, the same being on the inner face or side of said hook and facing the slot $c'$ of the link. The wear member G is of hardened metal and curved, substantially as shown, so that it is exposed on one of the inner faces of the hook. When a series of links are connected together the wear member F, on each coupling bar, will engage with the wear member G on the hook of a link, and thus the hard-metal members F, G, will engage to reduce the friction or wear on the links, the convex surfaces $f$ of the members F, having limited contact with the concave faces of the members G.

It will be understood that the links of Figs. 1 to 10, inclusive, may be provided with the hard-metal wear-members F, G.

Under some circumstances, I may provide the body portion B of each link with a wear member H, the same being located on the outer face of the hook and body, and having the compound curvature indicated by Fig. 11. The member H is adapted for engagement with the sprocket tooth on the pitch line, substantially as heretofore described.

The members F, G and H, of the link are integral with the link, being provided therein during the operation of casting said link. It will be understood, however, that these wear-members may be supplied to the link in any other suitable or preferred way.

In Fig. 12 of the drawings I have represented another form of link adapted for use in connection with a chain wheel, the latter having a grooved periphery. The link of said Fig. 12 is constructed as heretofore described, and the sides I of said link are arched or concaved inwardly toward each other for the purpose of providing spaces at the sides of the link to receive projections on the flanges of the grooved chain wheel.

Although I have heretofore shown and described embodiments of the invention wherein a one-piece link is made by casting, or otherwise producing the same, it is to be understood that the invention is not strictly confined to such one-piece links, because, in Fig. 14, a two-piece pivoted link is represented. The body portion B' and the hook C' have the general construction characterizing my new link, but these parts B', C', are made in separate pieces. The body B' has side bars j, which are arched on their edges, and the end portion j' of said body B' is formed for the reception of the shank of the hook C'. Said end j' of the body B' is, furthermore, formed with a shoulder J, beneath which is adapted to fit the shank of the hook, said hook and the body being connected pivotally by a transverse pin J'. The members comprising the link are capable of a limited swinging or pivotal movement with respect to each other on the connecting pin J', but the shoulder J limits the relative movement of said parts in one direction, so as to cause the body B' and hook C', to maintain the angular or curved relation which characterizes my new link, whereby the hook is adapted to fit between the teeth of the sprocket, and the body lies over the end portion of the sprocket teeth, substantially as hereinbefore described.

I also contemplate a further modification of the links for the purpose of limiting the side motion of the connected links relative to each other. In this form of the invention the sides, or side bars, k, of the link are arched, particularly on the upper portion of the body, as shown by Fig. 13, although such arched construction of the side bars may be below the body, as well as above it. The hook of one link engages the coupling bar of the next link in such a manner as to be received between the arched sides of the link, thus confining the links against undesirable edgewise movement relative to each other. Furthermore, my invention is not restricted to the employment of inserted wear members on the link. The hook and coupling bar are provided with hardened wear services which are produced by "chilling" the metal subsequent to casting the link, such chilling being produced in a manner well known to those skilled in the art.

It will be understood that my invention is not to be limited to a construction of the link wherein the web E of Figs. 8, 9, and 10, or the side shrouds of Figs. 5, 6 and 7, or the arched side bars of Fig. 13 are employed for holding the links in the line of draft, because under some conditions the aforesaid parts may be omitted from the construction of the link. One of the conditions referred to is the use of the chain in connection with sprocket wheels, the axes of which are at an angle to each other. To adapt the chain for engagement with such wheels, it is desirable to permit the links to have a limited edgewise movement relative to each other, and to secure such result the coupling bar of each link may be concaved slightly, and the hook may have a slightly convex face, the radius of the curvature being the same on the bar and the hook, thus permitting the links to turn edgewise on each other slightly.

An important advantage of my new chain is that the construction of the link enables it to be driven, with almost equal advantage, in one direction or the other without subjecting the chain to a tendency to jam, crowd, or disconnect the links while passing around the sprockets. This advantage is due to the fact, mainly, that the hook of the chain has surfaces which engage with adjacent teeth of the sprocket, thus enabling the link to be driven in one direction or the other.

Although I have shown and described various embodiments of the link in the drawings and in the preceding description, still another form of link is shown in Figs. 15 and 16 of said drawings, the same embodying the characteristic features of the invention so far as concerns the link adapted for contact with the sprocket substantially on the pitch line thereof. The link L is in substance and effect a double link composed of one piece and provided with reversely positioned contacting surfaces m, o, one of which surfaces, m, coöperates with a tooth of a sprocket M whereas the other surface o is adapted for engagement with the teeth of a second sprocket O, the said sprockets being shown in dotted lines. The double link L, thus operates in conjunction with two sprockets for imparting motion simultaneously thereto.

Having thus described my invention, what I claim as new and desire to secure by Letters Patent is:—

1. In a device of the class described, a link comprising a body and a hook, said hook having the outer surface thereof, on the respective sides of a space in the hook, adapted for engagement with two adjacent sprocket teeth.

2. In a device of the class described, a link comprising a curved body and a hook, said body being curved to fit over a sprocket tooth, and said hook having a surface adapted for engagement with adjacent sprocket teeth, on the pitch line thereof.

3. In a device of the class described, a link comprising a body and a hook, the major portions of said body and hook being at an angle to each other, said body being provided with a coupling bar and said hook having surfaces adapted for engagement with sprocket teeth.

4. In a device of the class described, a one-piece link comprising a body and a hook, said body lying at an angle to the hook, and said hook having its respective outer surfaces adapted for engagement with sprocket teeth on the pitch line thereof.

5. A link comprising a non-slotted body arched in the direction of its length to engage only with the outer edge of a sprocket tooth, a hook at one end of the body, and a coupling bar at the other end of the body, said hook having an arched external surface to fit between adjacent sprocket teeth.

6. A link comprising a body arched in the direction of its length to engage only with the outer edge of a sprocket tooth, a curved hook, and a coupling bar, said body being arched beyond one side of a line intersecting the coupling bar and the hook, and said hook being shaped to fit between adjacent sprocket teeth and to engage therewith on the pitch line thereof.

7. A link comprising a body and a hook which are curved or bent in reversed directions, said hook being adapted to engage with adjacent sprocket teeth on the pitch line thereof and said body lying at one side of the line of draft through a chain composed of a plurality of the links.

8. A chain comprising connected links, each link having a coupling-hook and a body portion, said body portion being curved relative to the hook, and adapted to lie at one side of the line of draft through the chain.

9. In a device of the class described, a link comprising a body portion, and a hook curved to fit sprocket teeth on the pitch line thereof, the greatest thickness of said link being on the pitch line.

10. In a device of the class described, a link comprising a body, a hook at an angle to the body and provided with exposed surfaces adapted for engagement with sprocket teeth on the pitch line thereof, and means exteriorly of the body for holding the link against edgewise displacement on a sprocket member.

11. In a device of the class described, a link comprising a bent or curved body, a hook and a flange or web extending across the space between the adjacent surfaces of the body and the hook.

12. A one-piece link comprising a body, a hook at one end of the body, a coupling bar at the other end of the body, said body being curved longitudinally to enable it to fit over the outer end of a sprocket tooth, and side flanges or shrouds on the body.

13. A bent or curved link comprising a non-slotted body arched to enable it to fit over the outer end of a sprocket tooth, coupling members integral with the body and positioned at the respective ends thereof, and flanges or shrouds at the sides of the arched body.

14. The combination of a sprocket gear, and a chain, the links of said chain being provided with coupling hooks adapted to fit between the teeth of said gear, each hook engaging with two adjacent teeth on the pitch line thereof.

15. The combination of a sprocket gear, and a chain composed of links connected one to the other, each link being bent to fit over a tooth of said gear, and a hook of said link engaging with the teeth of said gear.

In testimony whereof I have signed my name to this specification in the presence of two subscribing witnesses.

MILES W. BEEMER.

Witnesses:
M. C. RODRIGUEZ,
J. I. JOHNSON.

Copies of this patent may be obtained for five cents each, by addressing the "Commissioner of Patents, Washington, D. C."